(12) United States Patent
Sumida et al.

(10) Patent No.: US 12,159,733 B2
(45) Date of Patent: Dec. 3, 2024

(54) WIRING MEMBER

(71) Applicant: Sumitomo Wiring Systems, Ltd., Mie (JP)

(72) Inventors: Shintaro Sumida, Mie (JP); Motohiro Yokoi, Mie (JP); Kenta Ito, Mie (JP); Suguru Yasuda, Mie (JP); Hitomi Harada, Mie (JP); Tetsuya Nishimura, Mie (JP); Ryusuke Kudo, Mie (JP); Haruka Nakano, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 117 days.

(21) Appl. No.: 17/612,793

(22) PCT Filed: May 12, 2020

(86) PCT No.: PCT/JP2020/018948
§ 371 (c)(1),
(2) Date: Nov. 19, 2021

(87) PCT Pub. No.: WO2020/241236
PCT Pub. Date: Dec. 3, 2020

(65) Prior Publication Data
US 2022/0246324 A1 Aug. 4, 2022

(30) Foreign Application Priority Data

May 31, 2019 (JP) .................................. 2019-102693

(51) Int. Cl.
H01B 7/18 (2006.01)
H01B 7/00 (2006.01)
H01B 7/08 (2006.01)

(52) U.S. Cl.
CPC ............. *H01B 7/18* (2013.01); *H01B 7/0045* (2013.01); *H01B 7/083* (2013.01)

(58) Field of Classification Search
CPC ........ H01B 7/18; H01B 7/0045; H01B 7/083; H01B 7/08; H01B 7/0823; H01B 7/0838; H02G 3/04; B60R 6/0207; B60R 6/0215
See application file for complete search history.

(56) References Cited

U.S. PATENT DOCUMENTS 9,627,102 B2 * 4/2017 Adachi ................ H01B 7/0045
10,867,721 B2 12/2020 Ishida et al.
(Continued)

FOREIGN PATENT DOCUMENTS

CN 2109649 7/1992
CN 103078278 A * 5/2013 ......... B60R 16/0215
(Continued)

OTHER PUBLICATIONS

Office Action issued in corresponding JP Application No. 2019-102693, dated May 10, 2022, along with an English translation thereof.
(Continued)

*Primary Examiner* — Paresh Paghadal
(74) *Attorney, Agent, or Firm* — Greenblum & Bernstein, P.L.C.

(57) ABSTRACT

A wiring member includes: a plurality of wire-like transmission members; and a sheet material to which the plurality of wire-like transmission members are fixed, wherein a reinforcement part intersecting with at least one of the plurality of wire-like transmission members is provided to the sheet material.

8 Claims, 6 Drawing Sheets

(56) References Cited

U.S. PATENT DOCUMENTS

| | | | | |
|---|---|---|---|---|
| 2003/0079905 A1* | 5/2003 | Higgs | ...................... | F16L 3/26 |
| | | | | 174/135 |
| 2005/0045361 A1* | 3/2005 | Arai | .................. | B60R 16/0215 |
| | | | | 174/72 A |
| 2015/0053479 A1* | 2/2015 | Takata | ................. | H02G 3/0481 |
| | | | | 174/72 A |
| 2016/0134039 A1* | 5/2016 | Tomikawa | ........... | H05K 1/0216 |
| | | | | 29/842 |
| 2018/0005726 A1* | 1/2018 | Hiramitsu | .............. | H01B 3/308 |

FOREIGN PATENT DOCUMENTS

| | | | | |
|---|---|---|---|---|
| CN | 202930845 | | 5/2013 | |
| CN | 207068504 | | 3/2018 | |
| CN | 208806424 | | 4/2019 | |
| JP | 60-168215 | | 11/1985 | |
| JP | 2018-137208 | | 8/2018 | |
| KR | 20180107031 A | * | 10/2018 | ......... B60R 16/0215 |

OTHER PUBLICATIONS

Office Action issued in Corresponding CN Patent Application No. 202080039463.2, dated Nov. 28, 2022, along with an English translation thereof.

International Search Report issued in International Pat. Appl. No. PCT/JP2020/018948, dated Jun. 16, 2020, along with an English translation thereof.

International Preliminary Report on Patentability issued in International Pat. Appl. No. PCT/JP2020/018948, dated Jun. 22, 2021, along with an English translation thereof.

\* cited by examiner

F I G. 5
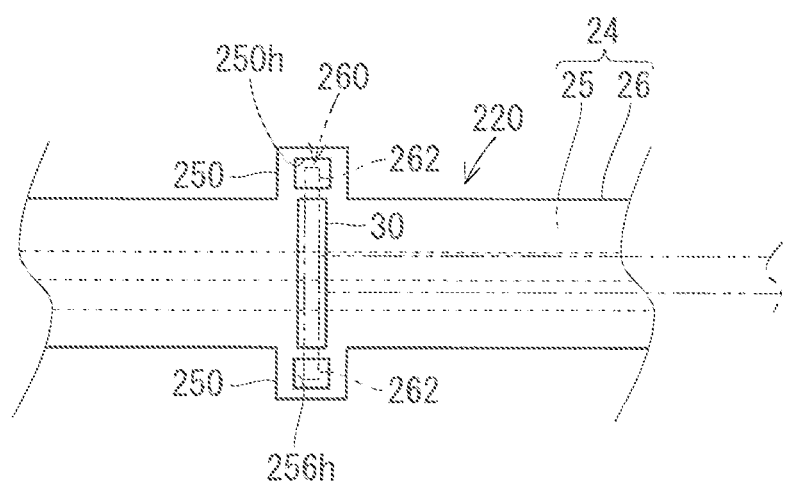

WIRING MEMBER

TECHNICAL FIELD

The present disclosure relates to a wiring member.

BACKGROUND ART

Patent Document 1 discloses a wire harness in which an electrical wire is welded to a functional exterior member formed into a sheet-like shape.

PRIOR ART DOCUMENTS

Patent Documents

Patent Document 1: Japanese Patent Application Laid-Open No. 2018-137208

SUMMARY

Problem to be Solved by the Invention

It is desired that a width direction is kept in a straight state at least in a part of a flat wire harness.

Accordingly, an object of the present disclosure is to keep at least a part of the wiring member in a straight state in a width direction.

Means to Solve the Problem

A wiring member according to the present disclosure is a wiring member including: a plurality of wire-like transmission members; and a sheet material to which the plurality of wire-like transmission members are fixed, wherein a reinforcement part intersecting with at least one of the plurality of wire-like transmission members is provided to the sheet material.

Effects of the Invention

According to the present disclosure, at least a part of the wiring member is kept in a straight state in the width direction.

BRIEF DESCRIPTION OF DRAWINGS

FIG. 5 is a schematic partially plan view illustrating a wiring member according to a second modification example.

DESCRIPTION OF EMBODIMENT(S)

Description of Embodiment of Present Disclosure

Embodiments of the present disclosure are listed and described firstly.

A wiring member according to the present disclosure is as follows.

(1) A wiring member includes: a plurality of wire-like transmission members; and a sheet material to which the plurality of wire-like transmission members are fixed, wherein a reinforcement part intersecting with at least one of the plurality of wire-like transmission members is provided to the sheet material. The reinforcement part intersecting with at least one of the plurality of wire-like transmission members is provided to the sheet material. Thus, at least a part of the wiring member is kept in a straight state in the width direction in a portion where the reinforcement part is provided.

(2) It is also applicable that the sheet material includes a first sheet material and a second sheet material, the first sheet material includes a fiber material, the plurality of wire-like transmission members are fixed to the first sheet material, and the reinforcement part is formed in or on the second sheet material. The first sheet material can hold the wire-like transmission member along a predetermined route. The wire-like transmission member can be protected from outside by the second sheet material. The reinforcement part is formed not in the first sheet material including a fiber material but in the second sheet material, thus at least a part of the wiring member is effectively kept in a straight state in the width direction.

(3) A hold assist part may be formed at a side part of the sheet material on an outer side of the plurality of wire-like transmission members. Accordingly, the wiring member is easily held by a robot hand, for example.

(4) The hold assist part may be a concave portion concaved from the side part to an inner side of the sheet material. The robot hand can hold the wiring member in a state where a finger of the robot hand is fit into the concave portion, for example.

(5) It is also applicable that the hold assist part is a holding piece protruding from the side part to an outer side of the sheet material, and a hole is formed in the holding piece. The finger of the robot hand is caught by the hole of the holding piece, thus the robot hand can hold the wiring member, for example.

(6) The hold assist part may be formed at a portion reinforced by the reinforcement part. The hold assist part is formed in a range reinforced by the reinforcement part, thus the wiring member is hardly bended in the state where the robot hand holds the wiring member, and the robot hand can hold the wiring member more reliably, for example.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment

Figure 1:
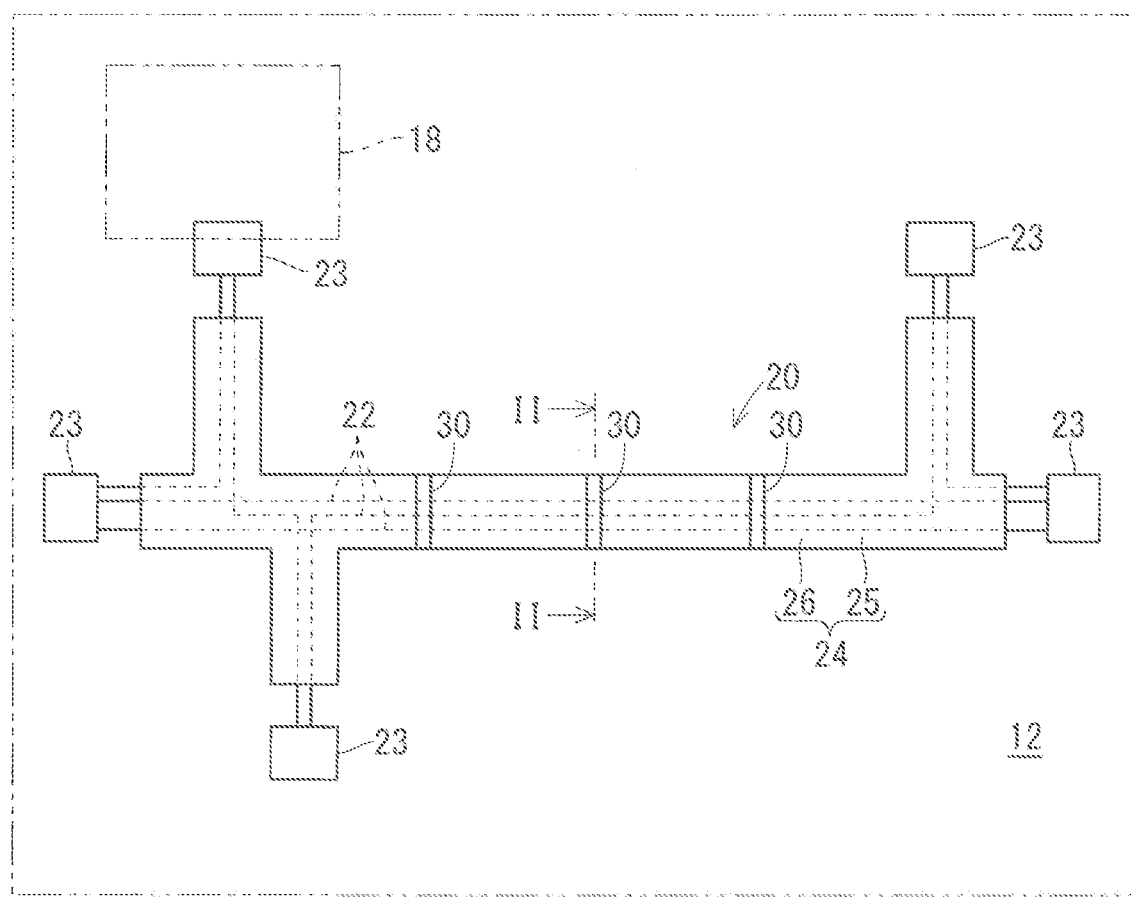
FIG. 1 is a schematic plan view illustrating a wiring member according to an embodiment.
Figure 2:
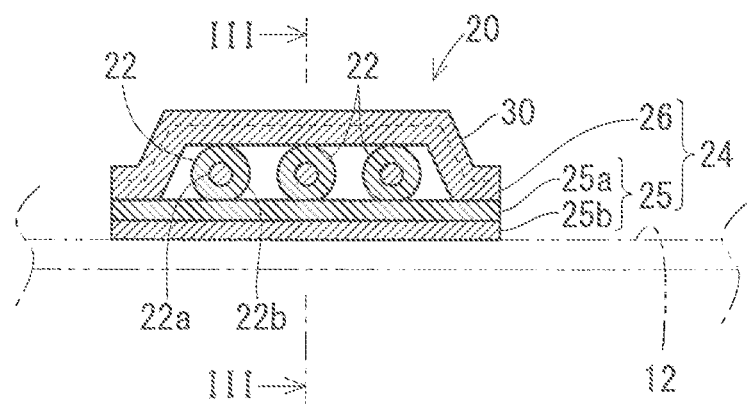
FIG. 2 is a schematic cross-sectional view along a 11-11 line in FIG. 1.
Figure 3:
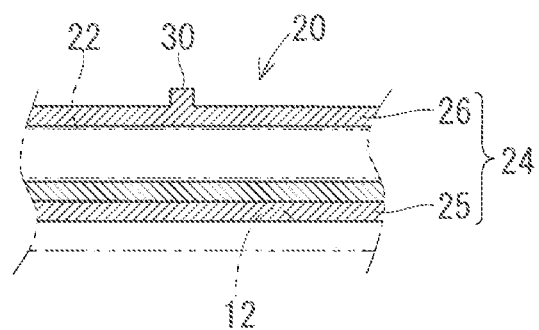
FIG. 3 is a schematic cross-sectional view along a III-III line in FIG. 2.

A wiring member according to an embodiment is described hereinafter. FIG. 1 is a schematic plan view illustrating a wiring member 20. FIG. 2 is a schematic cross-sectional view along a II-II line in FIG. 1. FIG. 3 is a schematic cross-sectional view along a III-III line in FIG. 2.

The wiring member 20 is a wiring member used for a vehicle. The wiring member 20 is disposed on a plate-like portion 12 in the vehicle, for example. The plate-like portion 12 is assumed to be a part of a metal body or a part of an interior panel in the vehicle, for example. At least one main surface of the plate-like portion 12 may have a flat surface shape At least a part of the wiring member 20 is disposed on a main surface of the plate-like portion 12 (particularly, a flat surface shape portion). A width direction of the wiring member 20 is preferably a direction along the main surface of the plate-like portion 12. Accordingly, the wiring member 20 is disposed in a narrow space along a main surface direction of the plate-like portion 12. The part of the metal body or interior panel may have a convex-concave shape in which a groove or a protrusion is formed.

The wiring member 20 includes a plurality of electrical wires 22 and a sheet material 24.

The electrical wire 22 is an example of a wire-like transmission member. More specifically, the electrical wire 22 includes a core wire 22a and a covering 22b. The core wire is a wire-like conductor formed by a metal conductive member, for example. The covering is an insulating part covering around the core wire. It is sufficient that the wire-like transmission member is a wire-like member transmitting an electrical power or light, for example. For example, the wire-like transmission member may be a bare conductive wire, a shielded wire, a twisted wire, an enamel wire, a nichrome wire, or an optical fiber in addition to the electrical wire.

The sheet material 24 is a member to which the plurality of electrical wires 22 are fixed. The plurality of electrical wires 22 are fixed to the sheet material 24, thereby being kept in a flat state along a predetermined route. The sheet material 24 includes a first sheet material 25 and a second material 26 herein. The plurality of electrical wires 22 are fixed on a side of one main surface of the first sheet material 25. The second sheet material 26 covers the plurality of electrical wires 22 from a side opposite to the first sheet material 25. Accordingly, an intermediate portion of the plurality of electrical wires 22 is surrounded by the first sheet material 25 and the second sheet material 26. Accordingly, an exposure of the intermediate portion of the electrical wire 22 is suppressed. The second sheet material 26 may be omitted.

A fixing state of the electrical wire 22 and the first sheet material 25 is not particularly limited, however, bonding or welding may also be applied. The bonding indicates that two members are bonded to each other via an inclusion such as an adhesive agent or a double-sided adhesive tape. The welding indicates that resin contained in at least one of two members are melted and the two members are welded to each other without an intervention of an inclusion. Herein, at least one of resin contained in the covering 22b of the electrical wire 22 and resin contained in the first sheet material 25 is melted and bonded to the other side member, thus the electrical wire 22 and the first sheet material 25 are fixed to each other. The welding in this case is performed by ultrasonic welding, for example.

A material constituting the first sheet material 25 and the second sheet material 26 is particularly limited. The first sheet material 25 and the second sheet material 26 are formed of materials containing resin of polyvinyl chloride (PVC), polyethylene terephthalate (PET), polypropylene (PP), or nylon, for example. The first sheet material 25 and the second sheet material 26 may be a fiber material having fiber such as a non-woven cloth, a woven fabric, or a knitting fabric or a non-fiber material, for example. The fiber material includes minute spaces formed between fibers. The non-fiber material may be a solid member with an inner portion evenly filled or a foam made up by foam molded resin. The first sheet material 25 and the second sheet material 26 may contain a material such as metal, for example.

The first sheet material 25 and the second sheet material 26 may be made up of a single layer or a plurality of stacked layers. When the first sheet material 24 is made up of the plurality of stacked layers, it is considered that a resin layer and a resin layer are stacked, for example. It is also considered that a resin layer and a metal layer are stacked, for example. The first sheet material 25 and the second sheet material 26 may be made up of a non-fiber material layer and a non-fiber material layer overlapped with each other, a non-fiber material layer and a fiber material layer overlapped with each other, or a fiber material layer and a fiber material layer overlapped with each other.

The first sheet material 25 has a double-layered structure herein. A first layer 25a in the first sheet material 25 is a layer appropriate for fixation to the electrical wire 22. For example, the first layer is formed into a solid member, with an inner portion evenly filled, of the same material as that of the covering 22b of the electrical wire 22. The electrical wire 22 is fixed on the first layer 25a. The second layer 25b is a layer enhancing a function of the sheet material 24. The second layer 25b is a non-woven cloth, for example. The first layer 25a may be wholly or partially provided on the second layer 25b.

The second sheet material 26 has a single-layered structure, for example. Herein, the second sheet material 26 is different from the first sheet material 25, thus does not include a fiber material, but is wholly formed to be a solid member with an inner portion evenly filled, for example. The second sheet material 26 is preferably formed by a resin material having rigidity higher than a constituent material of the first sheet material 25. A state where the second sheet material 26 is formed by a resin material having rigidity higher than the constituent material of the first sheet material 25 indicates that when a constituent material of the second sheet material and a constituent material of each part of the first sheet material have the same thickness and width, the former material has rigidity higher (higher Young's modulus) than the latter material. For example, the second sheet material 26 formed by nylon can be adopted as a material having rigidity higher than PVC which is an example of a constituent material of the first layer 25a and a non-woven cloth which is an example of a constituent material of the second layer 25b described above.

The electrical wire 22 needs not be fixed to the second sheet material 26. An edge portion of the second sheet material 26 is fixed to the first sheet material 25. A fixing state of the first sheet material 25 and the second sheet material 26 is not particularly limited, however, welding or bonding is also applicable. The second sheet material 26 may be fixed to the first layer 25a or the second layer 25b in the first sheet material 25. The second sheet material may be partially provided on the first sheet material.

The wiring member 20 may be branched in accordance with a position of each electrical component to which the wiring member 20 is connected. Illustrated herein is an example that the plurality of electrical wires 22 are branched at a plurality of positions (three positions herein). In this case, the sheet material 24 may be formed to be branched along a branch route of the electrical wire 22. A portion of the wiring member 20 where a largest number of electrical wires 22 are provided may be referred to as a main wire part. A portion where the electrical wires 22 are branched from the main wire part may be referred to as a branch wire part.

A connector 23 is attached to end portions of the plurality of electrical wires 22. Herein, the electrical wire 22 extends from an end portion of the sheet material 24 in both end portions of the main wire part and an end portion of the branch wire part. A terminal is attached to the end portion of the electrical wire 22 extending from the end portion of the sheet material 24, and the terminal is inserted into a cavity of the connector 23. The connector may be fixed to the end portion of the sheet. In this case, the electrical wire 22 may not extend from the end portion of the sheet material 24. The wiring member 20 is connected to the other electrical apparatus 18 via the connector 23, for example (one electrical apparatus 18 is exemplified in FIG. 1).

The example of the wiring member 20 is not limited to the above example. The wiring member 20 may be kept in a flat state so that a plurality of wire-like conductors are insulated from each other by a pair of films such as a flexible printed circuit (FPC) or a flexible flat cable (FFC), for example. The wiring member needs not have a branch wire part.

A reinforcement part 30 is provided to the sheet material 24 described above. The reinforcement part 30 is an elongated portion intersecting with at least one of the plurality of electrical wires 22. In FIG. 1, the plurality of reinforcement parts 30 are formed at intervals in the main wire part. Only one reinforcement part 30 may be provided. The reinforcement part 30 may be formed in the branch wire part.

Herein, the reinforcement part 30 is formed in or on the second sheet material 26. Herein, when the second sheet material 26 is molded, a portion which is partially and linearly thick is integrally molded as the reinforcement part 30 using a mold in the flat second sheet material 26. The reinforcement part 30 is formed in a partial region in the second sheet material 26 in an extension direction of the main wire part. The reinforcement part 30 extends to be perpendicular to the electrical wire 22 following the main wire part in the plurality of electrical wires 22. The reinforcement part may obliquely intersect with the electrical wire 22. In this portion, the reinforcement part 30 extends wholly along a width direction of the second sheet material 26. The reinforcement part 30 may be partially formed in the width direction of the second sheet material 26. The reinforcement parts 30 may be provided in parallel to each other at closer interval.

A thickness dimension of the reinforcement part 30 is larger than that of the other portion of the second sheet material 26. Herein, the reinforcement part 30 protrudes to an opposite side of the second sheet material 26 from the electrical wire 22. The reinforcement part may protrude to both surface sides of the second sheet material or an electrical wire side of the second sheet material.

Herein, a horizontal section of the reinforcement part 30 (a cross section in a surface perpendicular to an extension direction of the reinforcement part 30) is formed into a quadrangular shape, however, this configuration is not necessary. The horizontal section of the reinforcement part may have a triangular or semicircular shape, for example.

The thickness of the reinforcement part 30 is not necessarily larger than that of the other portion of the second sheet material 26. For example, it is also applicable that the reinforcement part protrudes to one main surface side of the second sheet material and a groove is formed along the reinforcement part on the other main surface side of the second sheet material. For example, the reinforcement part may be a shape portion bended into a V-like shape or a U-like shape to follow the width direction of the second sheet material.

In the present embodiment, the reinforcement part 30 is formed integrally with the second sheet material 26, however, the reinforcement part 30 may be formed integrally with the first sheet material 25. The reinforcement part 30 needs not be formed integrally with the first sheet material 25 or the second sheet material 26. A rod-like member formed separately from the sheet material 24 may be fixed to the sheet material 24. For example, the reinforcement part may be fixed to the first sheet material 25 or the second sheet material 26 by bonding or welding. Both end portions of the reinforcement part may be sandwiched between the first sheet material and the second sheet material to fix the reinforcement part to the sheet material. The reinforcement part may be formed by resin or metal. It is sufficient that the reinforcement part is fixed to the sheet material, thus the sheet material is hardly deformed in both surface sides in the width direction thereof. The reinforcement part 30 is preferably formed by a material having rigidity higher than a constituent material of the first sheet material 25.

According to the wiring member 20 having such a configuration, at least a part of the wiring member 20 is kept in a straight state in the width direction by the reinforcement part 30. Particularly, at least a part of the wiring member 20 is kept in a state of being hardly deformed on the both surface sides in the width direction.

Thus, in a case where the wiring member 20 is disposed on the plate-like portion 12, for example, even when a hand of a human or a robot hand takes up the both side portions of the wiring member 20, the wiring member 20 is hardly deformed. Thus, the hand of the human or the robot hand can firmly hold the wiring member 20. Even when a suction device sucks one main surface of the wiring member 20, one main surface of the wiring member 20 is kept in a flat surface state easily. Thus, the suction device can firmly suck the wiring member 20. Thus, handleability of the wiring member 20 by an operator or a robot, for example, is improved.

The wiring member 20 disposed on the plate-like portion 12 is considered to be partially fixed to the plate-like portion 12 by a double-sided tape or a vehicle fixation clamp (also referred to as a clip in some cases), for example. Even in this case, the wiring member 20 is hardly deformed on the both surface sided in the width direction, thus the side part of the wiring member 20 hardly bows or flutters.

The first sheet material 25 includes a fiber material, and the fiber material is light in weight and excellent in tensile strength. Thus, the electrical wire 22 can be held along a predetermined route with tensile strength acting on the electrical wire 22 as small as possible with a relatively light-weight configuration. The electrical wire 22 is protected from outside by the second sheet material 26. The reinforcement part 30 is formed not in the first sheet material 25 including the fiber material but in the second sheet material 26, thus at least a part of the wiring member 20 is effectively kept in a straight state in the width direction.

When the reinforcement part 30 is formed integrally with the first sheet material 25 or the second sheet material 26, the other member is unnecessary, and reduction in the number of components can be achieved.

A wiring member according to modification examples is described based on a premise of the embodiments described above. First and second modification examples described hereinafter indicate an example that hold assist parts 150 and 250 are formed in wiring members 120 and 220. The hold assist parts 150 and 250 are parts configured to have a role of assist a robot hand to hold the wiring member.

Figure 4:
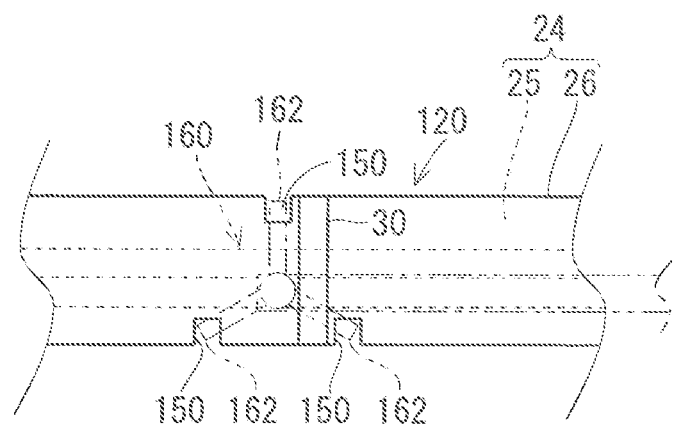
FIG. 4 is a schematic partially plan view illustrating a wiring member according to a first modification example.

In the wiring member 120 according to the first modification example illustrated in FIG. 4, the hold assist part 150 is formed at an edge portion of the sheet material 24 on an outer side of the plurality of electrical wires 22. Herein, the hold assist part 150 is a concave portion concaved from the side part to the inner side of the sheet material 24. In FIG. 4, the hold assist part 150 is formed into a concaved quadrangular shape. The hold assist part may be a concave portion having a concaved trapezoidal, triangular, or semicircular shape. Herein, the plurality of hold assist parts 150 are formed. The hold assist part 150 is formed as a concave portion in both the first sheet material 25 and the second sheet material 26. FIG. 4 illustrates a sketch of a robot hand 160 grasping the wiring member 120.

The hold assist part 150 is preferably formed at a portion reinforced by the reinforcement part 30. The portion reinforced by the reinforcement part 30 is a portion of the sheet material 24 hardly bended in a thickness direction compared with a case where the reinforcement part 30 is not provided. Herein, two hold assist parts 150 are formed at one side portion of the sheet material 24, and two hold assist parts 150 are formed at the other side portion thereof. One hold assist part 150 in the other side portion of the sheet material 24 is located between the two hold assist parts 150 in one side portion of the sheet material 24 in the extension direction of the sheet material 24. The reinforcement part 30 is located between the two hold assist parts 150 in one side portion of the sheet material 24. Particularly, the reinforcement part 30 is located in a position closer to one of the two hold assist parts 150 in one side portion of the sheet material 24. The reinforcement part 30 is located adjacent to one hold assist part 150 in the other side portion of the sheet material 24.

For example, the wiring member 120 is held by the robot hand 160 having three fingers 162 as follows. That is to say, the three fingers 162 in an opened state are disposed in an outer side position of the hold assist part 150. Subsequently, when the three fingers 162 are closed, the three fingers 162 fitted in the hold assist part 150 are caught by the side portion of the sheet material 24. In this state, a peripheral edge part of the hold assist part 150 is reinforced to be hardly bended in a front-back direction by the reinforcement part 30. Thus, the both side portions of the sheet material 24 is hardly bended to be turned up in a state where the three fingers 162 grasp the hold assist part 150. Thus, the robot hand 160 can firmly hold the wiring member 120. The robot hand 160 can hold the wiring member 120 and can move the wiring member 120 to a target position.

According to the present first modification example, the finger 162 fitted into the hold assist part 150 holds the wiring member 120, thus the wiring member 120 hardly deviates from the robot hand 160. Accordingly, the robot hand 160 can firmly hold the wiring member 120 at a constant position. The wiring member 120 hardly comes out of the robot hand 160. Accordingly, handling of the wiring member 120 by the robot hand 160, for example, an automatic assembly of the wiring member 120 to a vehicle can be easily performed.

Particularly, when the hold assist part 150 is provided on both sides of the reinforcement part 30 in the extension direction of at least one side part of the sheet material 24, the side part of the wiring member 120 is hardly bended in a position where the finger 162 is caught by the wiring member 120.

When the hold assist part 150 is provided adjacent w the reinforcement part 30 in at least one side part of the sheet material 24, the side part of the wiring member 120 is hardly bended in a position where the finger 162 is caught by the wiring member 120. The reinforcement part and the hold assist part may be adjacent to or separated from each other. The reinforcement part may be provided on an inner side of the hold assist part. A tolerable range of a distance between them can be appropriately set in accordance with rigidity of the sheet material 24 and a weight of the wiring member 120, for example. As an example, they may be 5 cm or less away from each other, or may also be 3 cm or less away from each other.

Figure 6:
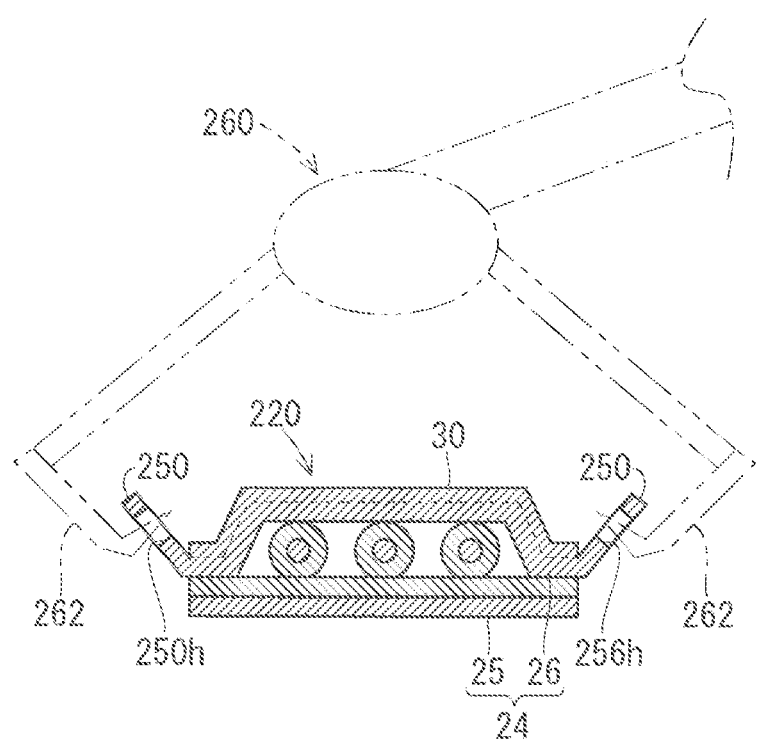
FIG. 6 is a schematic cross-sectional view illustrating the wiring member according to the second modification example.

In a wiring member 220 according to the second modification example illustrated in FIG. 5 and FIG. 6, a hold assist part 250 is formed at an edge portion of the sheet material 24 on an outer side of the plurality of electrical wires 22. Herein, the hold assist part 250 is a holding piece protruding from the side part of the sheet material 24 to the outer side. A hole 250h is formed in the hold assist part 250 as the holding piece. Herein, an outer shape of the hold assist part 250 is a quadrangular shape. The outer shape of the hold assist part may be a trapezoidal, triangular, or semicircular shape. The hole 250h is formed into a quadrangular shape herein. The hole 250h may have a trapezoidal, triangular, or semicircular shape, for example. Herein, the hold assist part 250 is an outer side extension portion of the second sheet material 26. The hold assist part may be an outer side extension portion of the first sheet material or an outer side extension portion of a portion where the first sheet material and the second sheet material overlap with each other. Each of FIG. 5 and FIG. 6 illustrates a sketch of a robot hand 260 grasping the wiring member 220.

Herein, a pair of hold assist parts 150 are formed at the both side portions of the sheet material 24. The pair of hold assist parts 250 are formed at the same position in the extension direction of the sheet material 24.

The hold assist part 250 is preferably formed at a portion reinforced by the reinforcement part 30. Herein, the reinforcement part 30 is formed between the pair of hold assist parts 250. Thus, a portion between the pair of hold assist parts 250 in the sheet material 24 is kept to be hardly bended on the both surface sides along the width direction thereof. The reinforcement part 30 does not reach the pair of hold assist parts 250. Thus, the pair of hold assist parts 250 can be deformed to be inclined to the both surface sides of the sheet material 24.

For example, the wiring member 220 is held by the robot hand 260 having two fingers 262 as follows. That is to say, as illustrated in FIG. 6, the two fingers 262 in an opened state are disposed in an outer side position of the hold assist part 250. Subsequently, when the two fingers 262 are closed, tip end portions of the two fingers 262 are fitted into the hole 250h of the hold assist part 250 and caught by a peripheral edge part of the hole 250h. In this state, the hold assist part 250 can be inclined to be directed in an obliquely upward direction with respect to the sheet material 24. Thus, the tip end portions of the two fingers 262 are easily caught by the hold assist part 250 in the state where the two fingers 262 are closed from the opened state. The sheet material 24 is kept in a straight state as much as possible in the width direction thereof between the pair of hold assist parts 250. Thus, a distance between the pair of hold assist parts 250 is kept constant easily. Accordingly, the robot hand 260 can firmly hold the wiring member 220. The robot hand 260 can hold the wiring member 220 and can move the wiring member 220 to a target position.

According to the present second modification example, the finger 262 fitted into the hold assist part 250 holds the wiring member 220, thus the wiring member 220 hardly deviates from the robot hand 260. Accordingly, the robot hand 260 can firmly hold the wiring member 220 at a constant position. The tip end portion of the finger 262 is caught by the hold assist part 250 in a posture directed in the obliquely upward direction with respect to the sheet material 24, thus the finger 262 can firmly catch and hold the wiring member 220. Thus, the wiring member 220 hardly comes out of the robot hand 260. Accordingly, handling of the wiring member 220 by the robot hand 260, for example, an automatic assembly of the wiring member 220 to a vehicle can be easily performed.

Particularly, the reinforcement part 30 is provided on the inner side of the hold assist part 250, thus the side part of the wiring member 220 is hardly bended in a position where the finger 262 is caught by the wiring member 220.

As illustrated in FIG. 5, the hold assist part 250 and the reinforcement part 30 need not be formed at the same position in the extension direction of the sheet material 24. The hold assist part may be provided adjacent to the reinforcement part The hold assist part may be provided between the plurality of reinforcement parts in the extension direction of the sheet material 24. A tolerable range of a distance between the hold assist part and the reinforcement part can be appropriately set in accordance with rigidity of the sheet material 24 and a weight of the wiring member 220, for example. As an example, they may be 5 cm or less away from each other, or may also be 3 cm or less away from each other.

The hold assist part may be a hole formed in a portion not protruding to an outer lateral side in the sheet material. It is sufficient that the hold assist part is a concave portion or a hole by which a finger of a robot hand, for example, is caught easily.

The configuration according to the hold assist parts 150 and 250 described in the first modification example and the second modification example can also be applied to a configuration in which the reinforcement part 30 is omitted. That is to say, the present embodiment discloses a wiring member including: a plurality of wire-like transmission members; and a sheet material to which the plurality of wire-like transmission members are fixed, wherein a hold assist part assisting a robot hand to hold the wiring member is formed on a side part of the sheet material on an outer side of the plurality of wire-like transmission members.

Each configuration described in the embodiments and each modification example described above can be appropriately combined as long as they are not contradictory.

EXPLANATION OF REFERENCE SIGNS 12 plate-like portion
18 electrical apparatus
20 wiring member
22 electrical wire
22a core wire
22b covering
23 connector
24 sheet material
25 first sheet material
25a first layer
25b second layer
26 second sheet material
30 reinforcement part
120 wiring member
150 hold assist part
160 robot hand
162 finger
220 wiring member
250 hold assist part
250h hole
260 robot hand
262 finger

The invention claimed is:
1. A wiring member, comprising:
a plurality of wire-like transmission members; and
a sheet material, including a first sheet material and a second sheet material, in which the plurality of wire-like transmission members are fixed to the first sheet material, and covered by the second sheet material, wherein
a reinforcement part intersecting with at least one of the plurality of wire-like transmission members is provided to the second sheet material,
the reinforcement part is molded integrally with the second sheet material using a mold,
a hold assist part is formed at a side part of the second sheet material on an outer side of the plurality of wire-like transmission members, and
the reinforcement part extends across a width of the second sheet material, the reinforcement part ending before an inner portion of the hold assist part in a width direction of the second sheet material.
2. The wiring member according to claim 1, wherein the first sheet material includes a fiber material.
3. The wiring member according to claim 1, wherein the hold assist part is a holding piece protruding from the side part to an outer side of the sheet material, and a hole is formed in the holding piece.
4. The wiring member according to claim 1, wherein the hold assist part is formed at a portion reinforced by the reinforcement part.
5. The wiring member according to claim 2, wherein the plurality of wire-like transmission members are welded to the first sheet material.
6. A wiring member, comprising:
a plurality of wire-like transmission members; and
a sheet material, including a first sheet material and a second sheet material, in which the plurality of wire-like transmission members are fixed to the first sheet material, and covered by the second sheet material, wherein
a reinforcement part intersecting with at least one of the plurality of wire-like transmission members is provided to the second sheet material,
the second sheet material includes the reinforcement part having the reinforcement part protruding to a side opposite to the plurality of wire-like transmission members, and
the reinforcement part extends across a width of the second sheet material, the reinforcement part ending before an inner portion of a hold assist part in a width direction of the second sheet material.
7. The wiring member according to claim 6, wherein the first sheet material includes a fiber material.
8. A wiring member, comprising:
a plurality of wire-like transmission members; and
a sheet material, including a first sheet material and a second sheet material, in which the plurality of wire-like transmission members are fixed to the first sheet material, and covered by the second sheet material, wherein
a reinforcement part intersecting with at least one of the plurality of wire-like transmission members is provided to the second sheet material, a hold assist part is formed at a side part of the second sheet material on an outer side of the plurality of wire-like transmission members where the reinforcement part is not located, the reinforcement part is molded integrally with the second sheet material using a mold, and the reinforcement part extends across a width of the second sheet material, the reinforcement part ending before an inner portion of a hold assist part in a width direction of the second sheet material.

\* \* \* \* \*